United States Patent [19]

Johnson

[11] 4,042,191
[45] Aug. 16, 1977

[54] SLOT SEAL FOR LEADING EDGE FLAP

[75] Inventor: Kirby William Johnson, Seattle, Wash.

[73] Assignee: The Boeing Company, Seattle, Wash.

[21] Appl. No.: 682,567

[22] Filed: May 3, 1976

[51] Int. Cl.² ............................................. B64C 9/26
[52] U.S. Cl. ................................................ 244/214
[58] Field of Search ............ 244/42 R, 42 DA, 42 D, 244/42 CA; 277/DIG. 6, 27

[56] References Cited

U.S. PATENT DOCUMENTS

| | | | |
|---|---|---|---|
| 3,047,257 | 7/1962 | Chester | 244/42 DA |
| 3,730,538 | 5/1973 | Silverstone et al. | 277/DIG. 6 |
| 3,910,530 | 10/1975 | James | 244/42 CA |
| 3,949,957 | 4/1976 | Portier | 244/42 CA |

*Primary Examiner*—Robert J. Smith
*Attorney, Agent, or Firm*—Christensen, O'Connor, Garrison & Havelka

[57] ABSTRACT

A seal assembly for sealing the slot formed between the aft end of an extended leading edge flap and the leading edge of a wing includes a flexible, blade-type seal extending spanwise between the leading edge flap and the wing. The upper end of the seal is attached to the underside of the leading edge flap adjacent its aft end and extends downwardly therefrom. The bottom portion of the seal is normally spaced from the leading edge of the wing. The seal is flexible so that when air is flowing over the leading edge flap and the wing, airflow from the underside of the flap causes the lower end of the seal to move toward the leading edge of the wing and intimately engage the leading edge of the wing in sealing contact. After the bottom edge of the seal engages the leading edge of the wing, the differential pressure between the upper surface of the flap and the wing and the region below the leading edge flap maintains the seal in contact with the leading edge. The seal is sufficiently resilient so that it flexes to its normal position spaced from the wing when the airflow over the wing and flap ceases, as when the airplane stops or after retraction of the flap is initiated.

5 Claims, 3 Drawing Figures

U.S. Patent  Aug. 16, 1977  4,042,191
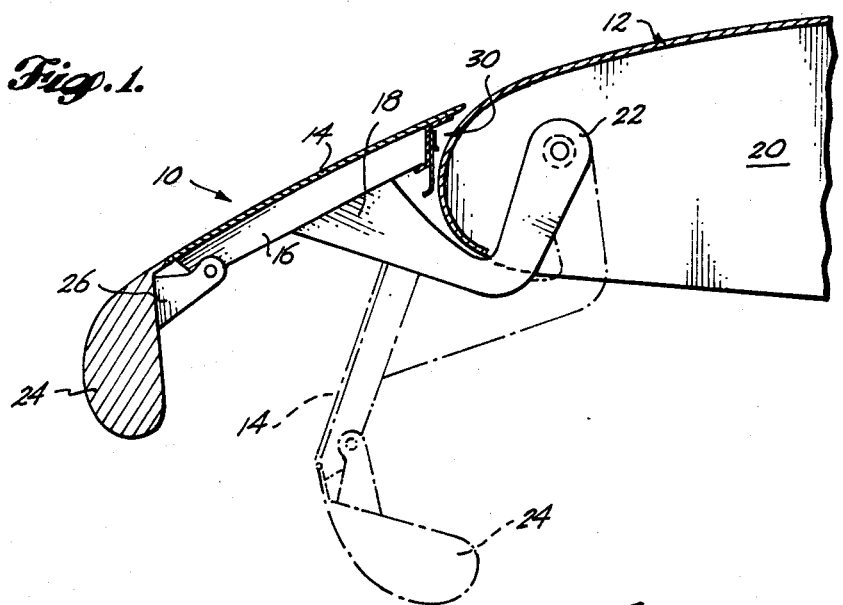
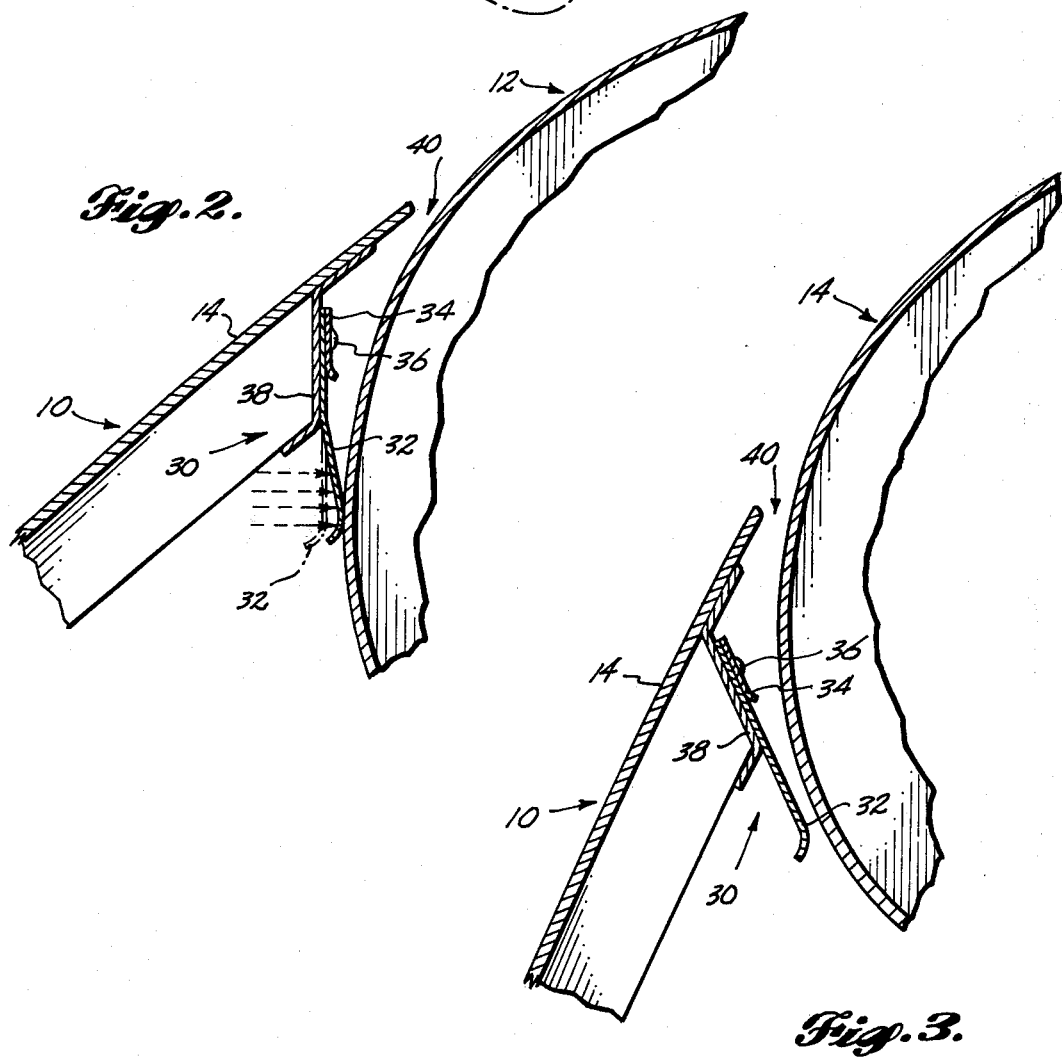

SLOT SEAL FOR LEADING EDGE FLAP

BACKGROUND OF THE INVENTION

The present invention relates to leading edge flap assemblies for airplane wings and more particularly to a seal assembly for sealing the slot between the aft portion of a leading edge flap and the leading edge of a wing when the flap is extended.

Leading edge flaps of the Krueger type and variable camber leading edge flaps such as disclosed in U.S. Pat. No. 3,504,870 to Cole et al. are normally stowed in a recess in the bottom of the wing adjacent the leading edge when they are not in use. When extended, the flaps are swung out of the recess in the wing to a position forwardly of the leading edge of the wing and are oriented so as to increase the camber and chord of the wing for takeoff and landing maneuvers. When extended, the structure of the leading edge flap inherently creates a gap or slot between the aft portion of the flap and the leading edge of the wing. In normal use, the air pressure on the top of the wing is less than it is below the flap and below the wing. This differential pressure causes air to flow from below the flap through the slot to the upper surface of the wing. Depending upon the particular flap design and the wing and trailing edge flap with which the leading edge flap is to be employed, the air flowing through the slot can disrupt the smooth airstream flowing over the top of the wing and cause a reduction in lift. It has therefore been found desirable in some instances to employ a seal, normally affixed to the leading edge flap, that closes this slot to prevent airflow through it.

One type of seal that has been used comprises a long, elongate, resilient member that is affixed to the aft portion of the leading edge flap along its entire span. After the flap is extended or as it is extended, the seal is mechanically motivated toward the leading edge of the wing to engage the leading edge and seal the slot. Although such seals are effective for the intended purpose, they are relatively complex and expensive to manufacture and install on aircraft. Moreover, the mechanical actuating mechanism adds weight to the overall flap assembly, ultimately reducing the payload of the aircraft. In addition, the seals have been difficult to construct so that constant contact between the seal and the leading edge of the wing is maintained. Consequently, some of the mechanical seals have tended to leak, allowing some reduction in lift and thus not completely filling their intended purpose.

Another type of seal that has been employed to close the slot between the leading edge flaps and the wing are the constant contact or friction type. This type of seal is permanently affixed to the aft portion of the underside of the flap. As the flap is extended, the seal contacts the wing and, because it is resilient, compresses or flexes between its flap attachment bracket and the leading edge of the wing. When the seal is in place, it is partially compressed so as to form an effective closure for the slot. This type of seal is simpler than the mechanically actuated type, less expensive and is lighter. However, the problem of non-uniform contact between the seal and the leading edge of the wing remains because this type of seal necessarily has a limited compression distance. Compensating for the non-uniform contact requires completely readjusting the seal location on the flap relative to the wing leading edge. Moreover, the fixed seal must rub on the leading edge of the wing as the flap is extended in order to compress it sufficiently to prevent airflow between the seal and the leading edge of the wing. Through many cycles of retraction and extension of the flap, the constant rubbing between the seal and the leading edge of the wing causes wear on both the seal and the leading edge, requiring periodic replacement of the seal or the leading edge skin or both.

It is therefore a broad object of the present invention to provide a light, inexpensive, simple seal construction for closing the slot between the leading edge flap and the leading edge of the wing. Further objects of the present invention are: to provide a seal assembly that minimizes or eliminates the rubbing contact between the seal and the leading edge surface of the wing during the retraction and extension cycles of the flap; to provide a seal assembly and seal member that will uniformly contact the leading edge of the wing despite slight contour variations in the wing; to provide a seal assembly that is usable with a variety of flap configurations, including fixed camber and variable camber flaps; to provide a seal assembly that allows greater freedom in designing the extended flap position, especially the positioning of the trailing edge of the flap relative to the leading edge of the wing and the angular orientation of the extended flap relative to the chord line of the wing; and to provide a seal assembly that is essentially self-actuating in that no mechanical motivation is necessary.

SUMMARY OF THE INVENTION

In accordance with the foregoing objects, and other objects that will become apparent to one of ordinary skill upon reading the following specification, the present invention provides a seal for closing the slot between a leading edge flap and an airplane wing. The seal comprises a thin, flexible member attached to the underside of the flap adjacent its trailing edge. The flexible member has a lower edge portion adapted for sealing contact with the leading edge of the wing when the flap is extended. The flexible member is sufficiently resilient to normally flex away from the leading edge of the wing during the retraction and extension cycles, and is sufficiently flexible to allow its lower portion to flex rearwardly and sealingly engage the leading edge of the wing. The flap member is caused to flex rearwardly responsive to airflow through the slot and is locked in sealing engagement with the leading edge by the differential pressure between the upper surface of the wing and flap and the region under the flap below the flexible member when air is flowing over the flap and wing.

BRIEF DESCRIPTION OF THE DRAWINGS

A better understanding of the present invention can be derived by reading the ensuing specification in conjunction with the accompanying drawings wherein:

FIG. 1 is a chordwise cross-sectional view of the forward portion of a wing and a leading edge flap structure employing the seal assembly of the present invention;

FIG. 2 is a greatly enlarged and simplified view of the seal assembly of the present invention with the flap fully extended; and FIG. 3 is a view similar to FIG. 2 showing the flap partially retracted wherein the seal member is spaced from the leading portion of the wing.

Detailed Description

Referring first to FIG. 1, a leading edge flap, generally designated 10, is pivotally connected to a forward structural member in a wing 12. For purposes of simplicity, the actuating mechanism for extending and retracting the flap has been omitted from the drawings. Leading edge flaps of this type are known in the art and can be constructed from disclosures such as those of the Cole patent mentioned above. The leading edge flap has an upper surface skin 14 affixed to and supported by rigid rib-like members 16. The flap illustrated is of the fixed camber type wherein the skin 14 has the same curvature both when extended and when retracted. The leading edge flap 10 is supported on the wing by an arcuate gooseneck 18 affixed to the rib-like member 16. The gooseneck 18 extends rearwardly and thereafter upwardly into a recess 20 in the bottom of the wing in which the flap is stowed when retracted. The gooseneck 18 is pivotally mounted on a suitable bearing rod 22 in turn affixed to the structural member in the wing. The flap 10 also includes a bullnose 24 secured to a mounting arm 26 in turn pivotally mounted on the forward end of the rib-like member 16.

It is to be understood that FIG. 1 is a cross-sectional depiction of a leading edge flap and the forward portion of a wing to which it is attached. Both the wing and the flap have a spanwise dimension in addition to the chordwise dimension shown. In addition it is to be understood that a plurality of rib-like members 16 are spaced at predetermined locations along the span of the flap. Moreover a plurality of goosenecks similar to gooseneck 18 support the flap 10 at spaced locations along the span. When the flap is extended, the bullnose 24, also having a spanwise dimension, forms the arcuate leading portion of the flap, and the trailing edge of the upper surface panel 14 and the rearward portion of the rib-like member 16 are spaced from the leading portion of the wing 12 so as to form a spanwise slot 40 therebetween. As the flap is retracted, the bullnose folds rearwardly so that it resides above the rib-like member 16 when the flap is completely retracted and stowed in the recess. The flap and its supporting gooseneck are so constructed that when the flap is swung through its retraction arc (the flap is shown partially retracted in dotted outline in FIG. 1), the trailing edge edge of the upper surface panel 14 and the rib-like member 16 remain at all times spaced from the leading portion of the wing. When the flap is fully retracted the upper surface panel 14 of the trailing edge flap 10 forms a part of the bottom surface of the wing and covers the recess 20.

The seal assembly 30 of the present invention is fixed to the underside of the leading edge flap 10 adjacent its aft portion and adjacent the leading edge or leading portion of the wing 12. Referring to FIG. 2, the seal assembly 30 comprises a flexible blade-type seal 32, a clamping member 34 and an attachment rivet 36. The seal assembly is affixed to a Z-shaped stringer 38 that extends spanwise along the underside of the leading edge flap adjacent its trailing edge. The stringer 38 can be directly affixed to the bottom surface of the flap upper panel, or to the aft portion of the rib-like member 16, or to both. The seal 32 is preferably a blade that is composed of a thin sheet of steel or other strong, flexible, and resilient material that is coated on the surface that contacts the leading edge of the wing with a layer of low friction, wear-resistant material such as polytetrafluoroethylene. The elongate dimension of the seal 32 is preferably coextensive with the span of the flap assembly 10. The transverse dimension of the seal 32 is generally oriented in an upright position when the flap is extended. The upper portion of the seal 32 is attached to a vertical or upright surface of the Z-shaped stringer 38 via a plurality of rivets, one of which 36 is shown in FIG. 2. It is understood that the rivets are placed at suitable intervals along the entire span of the seal member and the stringer 38. The clamping member 34 extends in a spanwise direction and is interposed between the head of the rivet 36 and the seal member so as to distribute the securing force of the rivet and prevent damage to the seal member when the rivets affix the seal to the stringer 38. The central portion of the seal 32 and the lower portion of seal 32 extend downwardly below the lower end of the stringer 38.

When no air is flowing over the wing, the seal member is sufficiently resilient so that its lower end is spaced forwardly from the leading edge of the wing 12. This seal position is shown in dotted outline in FIG. 2. When the leading edge flap 10 is extended during flight, a low pressure is created above the upper surface of the flap 10 and above the upper surface of the wing 12 creating a low pressure in the slot 40. Air below the leading edge flap 10 tends to flow upwardly toward the slot 40. As this occurs, the moving airstream causes the lower portion of the flexible seal 32 to move rearwardly towards the leading edge of the wing until the bottom end of the seal contacts the leading edge of the wing. Since the lower pressure is still present in the slot 40 and since the pressure below the leading edge flap 10 is higher than the pressure in the slot 40, the pressure differential will cause the seal to remain locked in sealing engagement with the leading edge of the wing.

To insure good sealing contact between the lower end of the seal 32 and the leading edge of the wing, the lower end of the seal is curved forwardly to form a rearwardly facing convex surface. Thus the distance at which the seal 32 is normally spaced from the leading edge of the wing is not critical because as the seal flexes rearwardly, a portion of the curved surface formed at the bottom of the seal will always contact the leading edge of the wing.

As the leading edge flap is retracted, it swings downwardly and rearwardly to and past the location shown in dotted outline in FIG. 1 and also shown greatly enlarged in FIG. 3. As the angle between the leading edge flap 10 and the wing 12 increases in a downward direction, the aerodynamic flow over the upper surface of the upper skin 14 of the flap is disturbed, increasing the pressure in the slot 40. As the flap movement continues in a downward direction, the pressure differential across the seal 32, i.e., the difference between the pressure in the slot 40 and the pressure below the flap, is reduced and ultimately reaches a predeterminable low value. When this predetermined low value is reached, the seal 32, because it is resilient, to flex forwardly away from the leading edge of the wing to its normal position spaced from the wing. It remains in this position as the leading edge flap is retracted to its stowed position in the recess in the bottom portion of the wing. Thus, the curved bottom portion of the seal member contacts the skin forming the leading portion of the wing only for a very small portion of the retraction and extension cycles, minimizing the rubbing contact between seal and the leading edge of the wing.

As will now be understood by one or ordinary skill, the relatively simple seal assembly of the present invention fulfills the objects set forth above. Namely, it provides uniform contact between the seal and the leading edge of the wing, it is usable with a variety of flap configurations, it requires no mechanical actuation, it is very simple and inexpensive to manufacture and install, it adds very little weight to the flap assembly and is, in essence, self-actuating. Although the present invention has been described in relation to a preferred embodiment, one of ordinary skill after reading the foregoing specification, will be able to effect various changes, alterations and substitutions of equivalents without departing from the broad concepts described above. It is therefore intended that the protection granted by Letters Patent hereon be limited only by the definition contained in the appended claims and equivalents thereof.

What is claimed is:

1. In a leading edge flap assembly for an airplane wing, said wing having a leading edge portion, an upper surface and a span, said flap having an upper surface, a span, an underside, and a trailing edge, said assembly including means for mounting said flap for movement between a retracted position wherein said flap is stowed in said wing, and an extended position wherein said flap is positioned forwardly of said wing so that its trailing edge is positioned adjacent the leading edge of said wing and so that the upper surface of said flap is oriented to increase the camber and chord of said wing and so as to form a slot between the leading edge of said wing and said flap, an improved assembly for sealing said slot comprising:

a member having a lateral dimension and a longitudinal dimension, said member having in the lateral dimension an upper portion, a lower portion and at least a flexible central portion, the longitudinal dimension of said member being oriented in a spanwise direction along said flap, the upper portion of said member being affixed to the underside of said flap, the lower portion of said member being positioned adjacent and normally spaced from the leading edge portion of said wing when said flap is extended, the central portion of said member being sufficiently flexible so that when air flows from the underside of said flap upwardly past said member and through said slot, said central portion of said member will flex to allow said lower portion of said member to move toward and contact the leading edge portion of said wing in sealing engagement.

2. The flap assembly of claim 1 wherein the lower portion of said member is generally upright, said member having a forward extension integral with said upright portion, the juncture of said upright portion and said forward extension forming a smooth, rearwardly facing, convex surface, said surface being so oriented relative to the leading edge of said wing as to sealingly contact said leading edge when the central portion of said member flexes.

3. The assembly of claim 2 wherein said member comprises a relatively thin blade-type seal member that is substantially coextensive with the span of said flap.

4. In a flap assembly for an airplane wing, a seal for sealing a slot between said flap assembly and said wing when said flap assembly is extended comprising:

a flexible member attached to the underside of said flap assembly adjacent said wing, said flexible member having a lower end portion adapted for sealing contact with said wing when said flap assembly is extended, said flexible member being sufficiently resilient to normally flex away from said wing and being sufficiently flexible to flex toward said wing to cause said lower end portion to sealingly engage said wing responsive to occurrence of a predetermined pressure differential between the upper surface of said flap assembly and said wing and the underside of said flap assembly.

5. A seal of claim 4 wherein said flexible member comprises a relatively thin blade-type seal member that is substantially coextensive with the span of said flap.

* * * * *